(12) United States Patent  
Eubanks

(10) Patent No.: US 6,328,626 B1
(45) Date of Patent: Dec. 11, 2001

(54) GAME CALL APPARATUS

(75) Inventor: Steve D. Eubanks, Stilwell, OK (US)

(73) Assignee: Primos, Inc., Jackson, MS (US)

( * ) Notice: Subject to any disclaimer, the term of this patent is extended or adjusted under 35 U.S.C. 154(b) by 0 days.

(21) Appl. No.: 09/420,681

(22) Filed: Oct. 19, 1999

(51) Int. Cl.$^7$ ................................................. A63H 5/00
(52) U.S. Cl. ...................... 446/397; 446/213; 446/418; 84/404
(58) Field of Search .................... 446/213, 397, 446/404, 418, 419, 421; 43/2; 84/403, 402, 404, 408–410, 416; D17/22, 23

(56) References Cited

U.S. PATENT DOCUMENTS

| | | | |
|---|---|---|---|
| D. 309,120 | 7/1990 | Stewart | D10/116 |
| D. 309,121 | 7/1990 | Stewart | D10/116 |
| D. 334,898 | 4/1993 | Lopez, III | D10/116 |
| D. 376,555 | 12/1996 | Gebhardt | D10/116 |
| D. 393,223 | 4/1998 | Hall | D10/116 |
| 1,982,888 | * 12/1934 | Tsukamoto | 84/402 |
| 2,642,699 | * 6/1953 | Green | 446/397 |
| 4,362,080 | * 12/1982 | DeArmas | 84/402 |
| 4,850,925 | 7/1989 | Ady | 446/207 |
| 4,932,920 | * 6/1990 | Hearn | 446/397 |
| 5,019,008 | * 5/1991 | Hughes | 446/418 |
| 5,158,494 | 10/1992 | Ball | 446/419 |
| 5,222,903 | 6/1993 | Parrott et al. | 446/207 |
| 5,334,074 | 8/1994 | Suminski | 446/418 |
| 5,484,320 | 1/1996 | Becker | 446/418 |
| 5,555,664 | 9/1996 | Shockley | 43/1 |
| 5,928,056 | 7/1999 | Molotschko | 446/418 |
| 6,231,418 | * 5/2001 | Hancock et al. | 446/397 |

OTHER PUBLICATIONS

Woods Wise Products 1998 Brochure, "WW Contact Doe Grunl" shown on p. 3.

* cited by examiner

Primary Examiner—Kien T. Nguyen
Assistant Examiner—Urszula M. Cegielnik
(74) Attorney, Agent, or Firm—Foster & Foster

(57) ABSTRACT

A game call having a striking member and a body member, the body member forming an enclosure about a central cavity and having a pair of opposing edges defining a longitudinal opening that is contiguous with the central cavity. The body member has an inner surface and an outer surface, with a scalloped surface extending from the outer surface adjacent each of the opposing edges. The striking member is engaged against the body member in combinations of striking actions and sliding actions along one or both of the scalloped surfaces to create sounds similar to rattling antlers of antlered game.

25 Claims, 3 Drawing Sheets

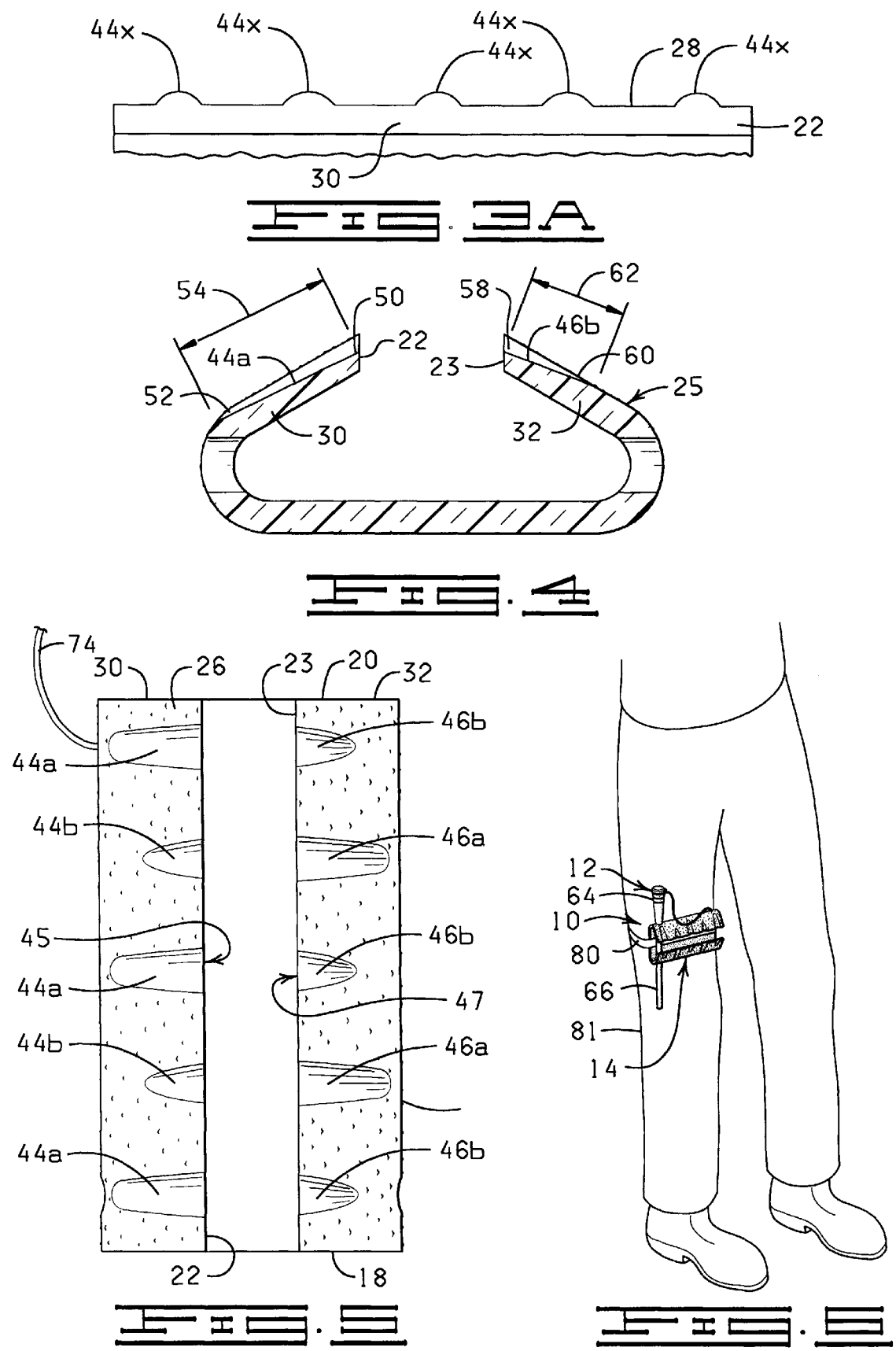

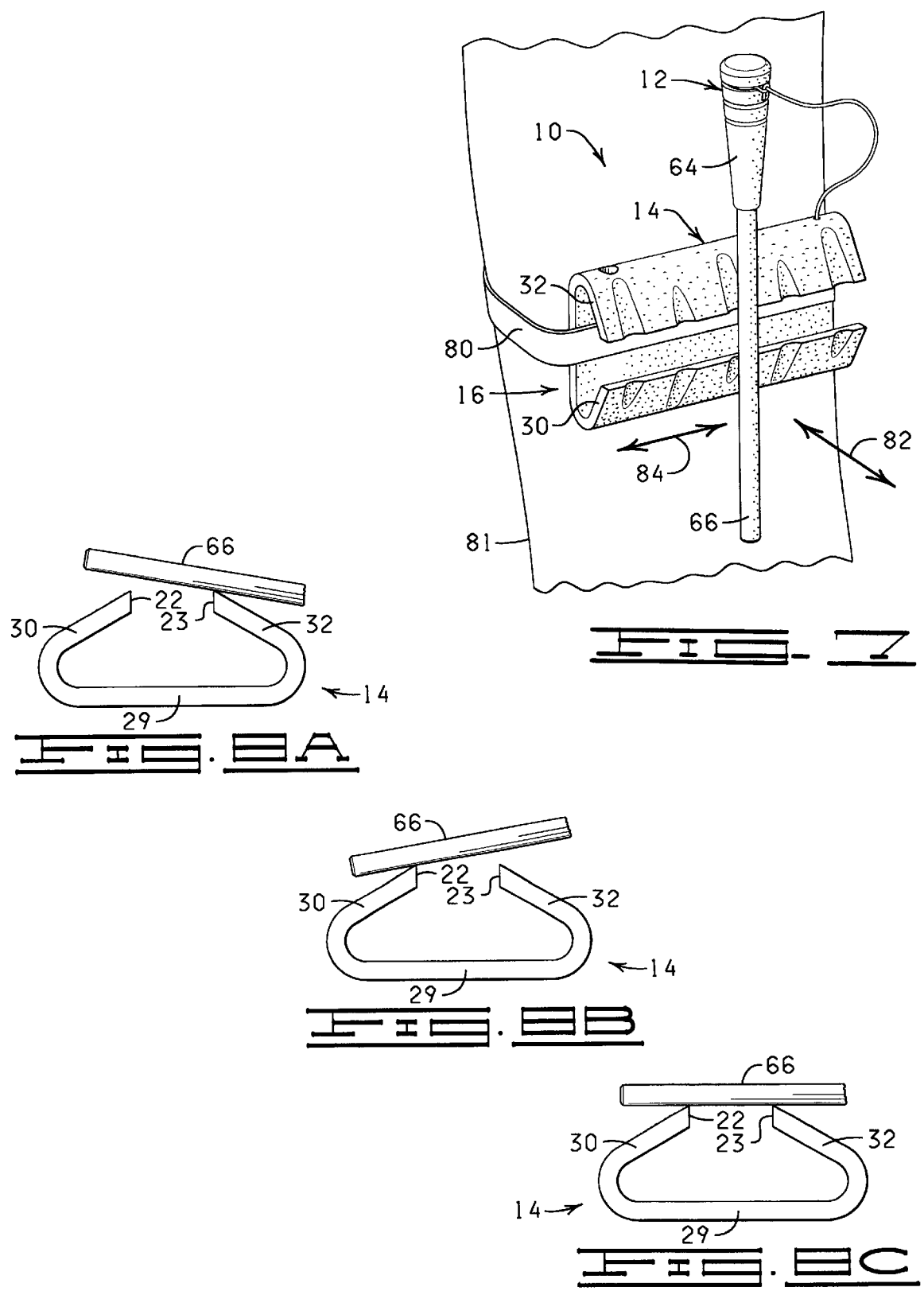

GAME CALL APPARATUS

FIELD OF THE INVENTION

The present invention relates generally to the field of game calls, and more particularly, but not by way of limitation, to a game call and associated method for creating sounds simulating the rattling antlers of sparring game animals.

BACKGROUND

Game hunters, photographers, and naturalists alike have long known the best way to view antler-bearing game animals is to be stationary and to attract the game animal to a desired area. This is because antlered animals, such as deer and elk, have keen senses of sight, smell and hearing, which when combined with the animal's speed and dexterity makes tracking such animals more difficult.

Numerous approaches have been developed to effectively attract an animal to a desired area, including, but not limited to, game calls, scents, and decoys. Game calls are generally devices that are used to simulate sounds associated with the animal.

One type of widely used game call is a reed-bearing device through which a user exhausts pulmonary air to produce sounds similar to that of an animal cry. Typical of these devices include U.S. Pat. No. 4,850,925 issued to Ady; U.S. Pat. No. 5,222,903 issued to Parrott et al.; and U.S. Des. Pat. No. 393,223 issued to Hall.

Another type of widely used call is a percussion device that produces sounds similar to the rattling antlers of sparring animals. These devices generally include two or more members that are struck together to produce the desired percussions. Typical of these devices include U.S. Pat. No. 5,158,494 issued to Ball; U.S. Pat. No. 5,334,074 issued to Suminski; U.S. Pat. No. 5,484,320 issued to Becker; U.S. Des. Pat. No. 376,555 issued to Gebhardt; and U.S. Pat. No. 5,928,056 issued to Molotschko.

A recognized problem in the art is that these percussion device solutions require two hands to operate the associated devices. That is, to produce the desired percussions the user must occupy one hand with one portion of the noise making device and strike it against another portion of the noise making device that is supported in the user's other hand. This means the user cannot manipulate other equipment, such as a camera or a firearm, while using the game call.

Solutions have been attempted that permit a hands-free operation of a percussion-type game call. One such solution is provided by U.S. Pat. No. 5,555,664 issued to Shockley, which teaches a pair of antlers suspended by a motor actuated linkage which, when actuated, brings the antlers into engagement with one another. The motor can be actuated by the user who remotely controls a radio controlled servo, or the motor can be controlled by automatic timing schemes.

Drawbacks to this solution are apparent. The complexity of the electromechanical device makes it relatively expensive and maintenance intensive. The device is also relatively cumbersome to set up and to relocate.

Another recognized problem in the art is that these and other devices are incapable of producing authentic sounds of a sparring match which in reality varies in intensity from very light ticks, in early phases of a sparring match, to violent clashing associated with an all-out battle.

The art has advanced to a state which provides numerous alternatives of percussion-type devices that effectively attract game animals. There is a need, however, for a simple and inexpensive device that permits a hands-free operation enabling the user to use the game call simultaneously with other equipment such as a camera or a firearm, and which would furthermore permit the user to create the full range of various sounds similar to that of a sparring match between antlered animals.

BRIEF SUMMARY OF THE INVENTION

The present invention is a game call for creating sounds similar to rattling antlers for attracting antlered animals. The game call has a body member with a proximal end and a longitudinally disposed distal end, an inner surface extending between the proximal end and the longitudinally disposed distal end and defining a central cavity, an outer surface substantially parallel to the inner surface, and a pair of opposing longitudinal edges defining a longitudinal opening contiguous with the central cavity. A scalloped surface is provided by a plurality of concave indentations disposed at longitudinal spacings in the body member and laterally extending from a first edge of the pair of opposing longitudinal edges. A scalloped surface is furthermore provided by a plurality of concave indentations disposed at longitudinal spacings in the body member and laterally extending from a second edge of the pair of opposing longitudinal edges.

The game call furthermore has a striking member having a handle portion and a striking bar portion. The user of the game call of the present invention grasps the handle portion of the striking member and strikingly and slidingly engages the striking bar portion of the striking member against the scalloped surfaces by engaging one or the other of the scalloped surfaces or by engaging both scalloped surfaces simultaneously, depending on the desired sound created by the game call.

A strap is receivingly disposed longitudinally within the central cavity and wraps around and attaches to a user's leg to supportingly attach the game call to the user's leg for a hands-free transport and operative support of the game call. The striking member is receivingly disposed in an aperture provided in the body member for storage of the striking member when the game call is not in use, and a flexible member is attached at one end to the handle of the striking member and is attached at an opposing end to the body member.

In this manner the game call can be used with one hand to strike and slide the striking member against the body member, which is supported by the user's leg. All the while, the user's other hand is freed to support a desired device such as a camera or a firearm. When an attracted animal is spotted, the user can drop the striking member and return both hands to the desired device, such as the camera or firearm, and the striking member being tethered by the flexible member falls silently so as to not frighten the animal away.

BRIEF DESCRIPTION OF THE SEVERAL VIEWS OF THE DRAWINGS

FIG. 3A is a side view of an alternative scalloped surface.

FIG. 4 is a cross-sectional view of the body member of the game call of the present invention showing one pair of the plurality of opposingly paired concave indentations of the scalloped surfaces adjacent the first edge and the second edge of the body member.

FIG. 5 is a top view of the body member showing the opposing arrangement of concave indentations adjacent the first and second edges of the body member.

FIG. 6 is a pictorial illustration of the game call of FIG. 1 operatively attached to a user's leg by a strap passing longitudinally within the central cavity of the body member and around the user's leg.

FIG. 7 is an enlarged detail view of a portion of the pictorial illustration of FIG. 6 further illustrating the manner in which the striking bar is moved to strike and slide against the body member to create the sounds of rattling antlers.

FIGS. 8a and 8b are end views of the body member showing the striking bar contacting only one of the two upstanding portions of the body member; FIG. 8c is an end view showing the striking bar contacting both upstanding portions of the body member simultaneously.

DETAILED DESCRIPTION OF THE INVENTION

Figure 1:
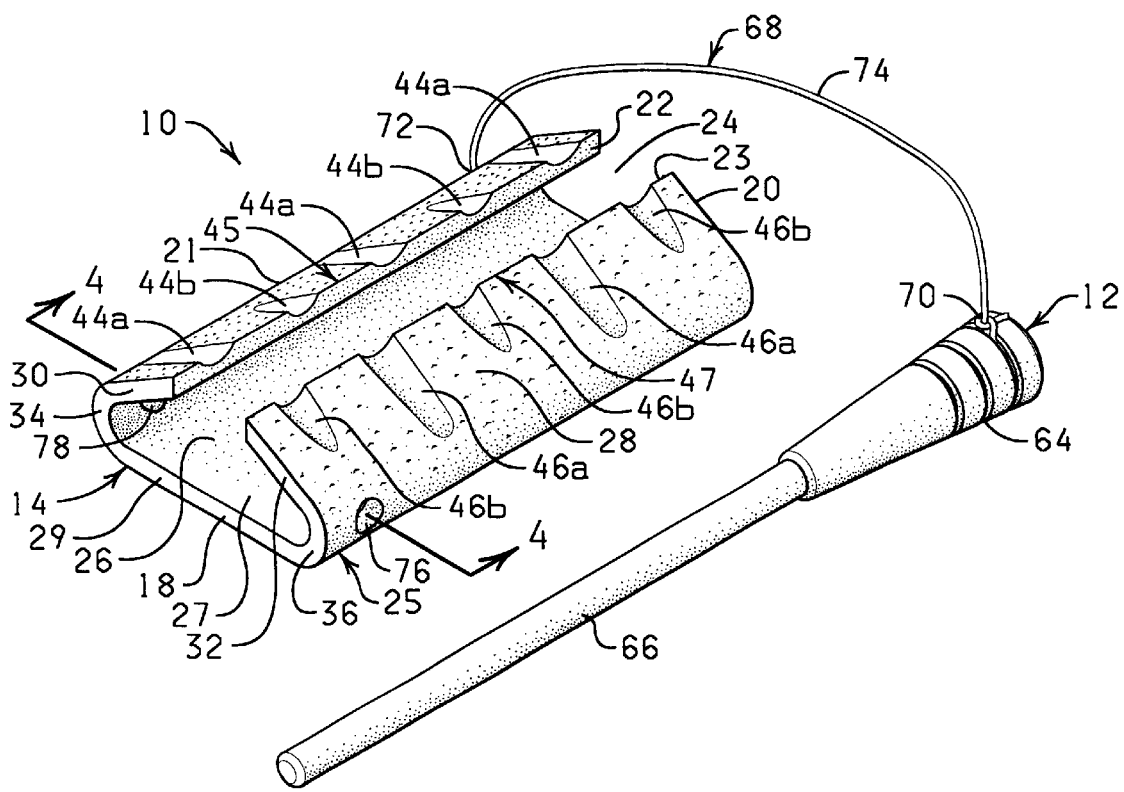
FIG. 1 is an isometric view of a game call that is constructed in accordance with the present invention.

Turning to the drawings as a whole, and more particularly first to FIG. 1, shown therein is a game call designated by the numeral 10 that is constructed in accordance with the present invention. The game call 10 generally has a striking member 12 used in combination with a body member 14 such that in striking and sliding the striking member 12 against the body member 14 certain percussions are created that are similar to the sound of the rattling antlers of game animals.

Figure 2:
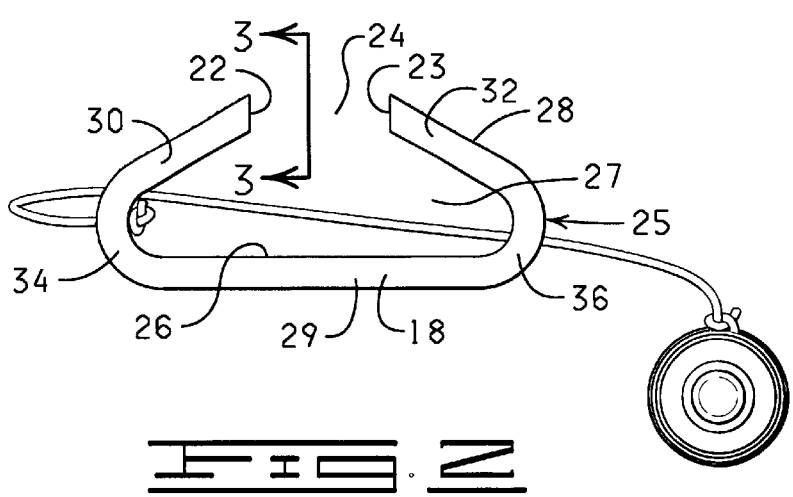
FIG. 2 is an end view of the body member of the game call of FIG. 1.

With particular attention to FIGS. 1 and 2, it will be noted that the body member 14 is substantially an arcuate annular member with a proximal end 18, a longitudinally disposed distal end 20, and a medial portion 21 disposed therebetween. The body member 14 has a longitudinally-disposed first edge 22 and an opposing longitudinally disposed second edge 23 that define a longitudinal opening 24. The body member 14 furthermore has a substantially arcuate web 25 interposed between the first edge 22 and the second edge 23. The body member 14 has an inner surface 26 that is concave-shaped in extending from the first edge 22 and over the web 25 to the second edge 23, and furthermore extending longitudinally to define a central cavity 27 that is contiguous with the longitudinal opening 24. The body member 14 furthermore has an outer surface 28 that is substantially parallel to the inner surface 26.

As shown in FIG. 2, the web 25 has a connecting portion 29 interposed between a substantially upstanding portion 30 and a substantially upstanding portion 32. An arcuate portion 34 joins the connecting portion 29 and the upstanding portion 30. Similarly, an arcuate portion 36 joins the connecting portion 29 and the upstanding portion 32.

The characteristic cross-sectional configuration of the body member 14 described hereinabove is referenced in the following description and corresponding drawings. It will be noted, however, that modifications to the cross-sectional configuration can be made without deviating from the present invention. Most generally, the present invention provides a body member (such as 14) having a pair of opposing edges (such as 22, 23), that define a longitudinal opening (such as 24), a web (such as 25) interposed between the first edge 22 and the second edge 23 and substantially enclosing a central cavity (such as 27) that is contiguous with the longitudinal opening.

Figure 3:
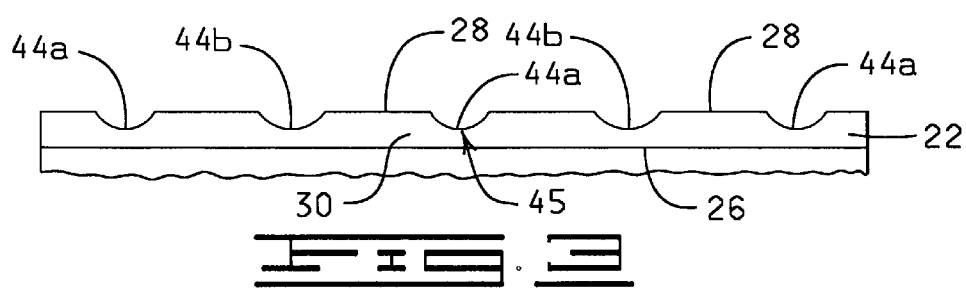
FIG. 3 is a side view of a portion of the body member taken along the line 3—3 of FIG. 1 and showing the scalloped surface adjacent the first edge of the body member.

As shown in FIGS. 1 and 3–5, the upstanding portion 30 of the web 25 has a plurality of longitudinally-spaced concave indentations 44a, 44b extending from the outer surface 28 of the body member 14. More particularly, adjacent the first edge 22, the body member 14 has a plurality of characteristic concave indentations 44a and a plurality of characteristic concave indentations 44b. The concave indentations 44a, 44b are each laterally disposed with one end intersecting the first edge 22 of the body member 14. Similarly, the upstanding portion 32 of the web 25 has a plurality of longitudinally-spaced concave indentations 46a, 46b extending from the outer surface 28 of the body member 14. More particularly, adjacent the second edge 23 the body member 14 has a plurality of characteristic concave indentations 46a and a plurality of characteristic concave indentations 46b. The concave indentations 46a, 46b are laterally disposed with one end intersecting the second edge 23 of the body member 14. FIG. 3 best shows the manner in which the concave indentations 44a, 44b, each of which extending from the outer surface 28, provide a scalloped surface 45 in the upstanding portion 30 adjacent the first edge 22 of the body member 14. Likewise, the concave indentations 46a, 46b provide a scalloped surface 47 (see FIG. 1) in the upstanding portion 32 adjacent the second edge 23 of the body member 14.

FIG. 4 is a lateral cross-sectional view of the body member 14 taken along the line 4—4 of FIG. 1, illustrating the concave indentation 44a provided in the upstanding portion 30 of the web 25, in opposition to the concave indentation 46b provided in the upstanding portion 32 of the web 25. The concave indentation 44a has a proximal end 50 that intersects the first edge 22 and a distal end 52 extending laterally therefrom the proximal end 50. The concave indentation 44a extends a selected distance between the proximal end 50 and the distal end 52 as denoted by the reference numeral 54. Similarly, the concave indentation 46b has a proximal end 58 that intersects the second edge 23 and a distal end 60 extending laterally therefrom the proximal end 58. The concave indentation 46b extends a selected distance between the proximal end 58 and the distal end 60 as denoted by the reference numeral 62.

It will be noted the length of the concave indentation 44a, as denoted by the reference numeral 54, is greater than the length of the concave indentation 46b, as denoted by the reference numeral 62. The differently configured concave indentations 44a, 46b operatively produce different percussions, the combination of which in a plurality as shown in FIG. 1 are suited to produce the sounds similar to that of rattling antlers in accordance with the present invention. The length and arrangement of the differently configured concave indentations can be varied without deviating from the contemplated scope of the present invention. In one construction of the present invention, as shown in FIGS. 1, 4 and 5, the concave indentations 44a, 46a can be provided approximately twice as long as the concave indentation 44b, 46b.

Otherwise configured concave indentations can be employed as well, including altering the depth and/or width of any one or all the concave indentations. It will further be noted that the present invention is not limited to an arrangement of arcuate concave indentations as described heretofore. FIG. 3A illustrates an equivalent alternative construction with convex-shaped protrusions 44x extending outwardly beyond the outer surface 28. In another equivalent construction the scalloped surface, whether formed of concave or convex extending portions, can have linearly segmented or otherwise non-arcuate surfaces extending from the outer surface 28. Any physical configuration of indentations, protrusions, or combinations thereof can be used in accordance with the present invention so long as the given configuration produces the desired sounds similar to the rattling antlers of sparring antlered animals.

In addition to the configuration of the concave indentations, changes can be made to the surface texture as well, as long as the given surface texture in combination with the given concave indentation configuration produces the desired sounds similar to the rattling antlers of sparring antlered animals.

FIG. 5 is a top view of the body member 14 illustrating an arrangement of a plurality of the concave indentations 44a, 44b which with portions of the outer surface 28 provide the first scalloped surface 45 in the upstanding portion 30 adjacent the first edge 22 of the body member 14. Likewise, an arrangement of a plurality of the concave indentations 46a, 46b with portions of the outer surface 28 provide the second scalloped surface 47 in the upstanding portion 32 adjacent the second edge 23 of the body member 14. The length of the concave indentation 44a is substantially equivalent to the length of the concave indentation 46a, and the length of the concave indentation 44b is substantially equivalent to the length of the concave indentation 46b. In an alternative construction these relative lengths can be varied.

The scalloped surfaces 45, 47 are provided by an alternating arrangement of a plurality of the characteristic concave indentations 44a, 46a and the characteristic concave indentations 44b, 46b. Moreover, each of the concave indentations 44a, 44b of the scalloped surface 45 is opposingly aligned with one of the plurality of concave indentations 46a, 46b of the scalloped surface 47. The alternating arrangement can be staggered, as in FIG. 5, so that opposing concave indentations 44a, 44b and 46a, 46b are of different lengths. In FIG. 5, for example, the opposing pair of concave indentations nearest the proximal end 18 of the body member 14 consists of a concave indentation 44a in the upstanding portion 30 adjacent the first edge 22 of the body member 14 and an opposing concave indentation 46b in the upstanding portion 32 adjacent the second edge 23 of the body member 14.

Returning to FIG. 1, the striking member 12 has a handle 64 and a striking bar 66 extending from the handle 64. An attachment member 68 has a first end 70, a second end 72, and a medial portion 74 interposed therebetween the first end 70 and the second end 72. The first end 70 of the attachment member 68 is attached to the handle 64 and the second end 72 of the attachment member 68 is attached to the body member 14 in order to connect the striking member 12 to the body member 14 for reasons that will be apparent hereinbelow. An aperture 76 can be provided in the arcuate portion 36 of the web 25 that is aligned with an aperture 78 provided in the arcuate portion 34 of the web 25 to receivingly engage the striking bar 66 so as to operatively store the striking member 12 in a manner facilitating ready access to a user for grasping the handle 64 and withdrawing the striking member 12 from the stored position which is shown in FIG. 6.

FIG. 6 furthermore illustrates the use of a strap 80 that is disposed longitudinally within the central cavity 27 and pressingly engages the inner surface 26 of the body member 14, the strap 80 being adapted to wrap around and attach to a user's leg 81 for an operative supporting engagement of the game call 10. By providing the connecting portion 29 (see FIGS. 1 and 2) of the web 25 as a substantially flat portion, a stable supporting surface is provided for pressing engagement of the web 25 against the user's leg 81 as the strap 80 is tightened to draw the body member 14 against the user's leg 81. Although shown attached to the user's leg, it will be understood the strap 80 could alternatively be tightened around other parts of the user's body such as, but not limited to, the user's arm or waist. Alternatively, the strap 80 could be the user's belt so that the body member 14 would be attached to the user's waist between belt loops on the user's pants.

Thus, it will be understood the game call 10 is operatively worn by the user in a hands-free manner. This is advantageous because it allows the user to have both hands on other equipment, such as a camera or a firearm (not shown), when not using the game call 10. When the user grasps the striking member 12 with one hand to use the game call 10, the user's other hand can remain available to support the other equipment. The striking member 12 can subsequently be dropped to return both hands to the other equipment, and the attachment member 68 prevents the striking member 12 from hitting the ground where it would otherwise make undesirable noise that could frighten the game, or where the striking member could otherwise become lost, soiled or damaged.

Numerous variations to the embodiment illustrated in FIGS. 1–8 have been discussed, wherein the cross-sectional configuration of the body member 14 and the shape, size, and arrangement of the scalloped surfaces 45, 47 can likewise be varied without deviating from the scope of the present invention. The particular configuration will be determined by a number of factors such as, but not limited to, the personal preference of the user in what sounds are created, and by what striking actions are preferred by the user. The selected material used in construction of the body member 14 and the striking member 12 will also affect the physical configurations at hand. In a preferred construction, the body member 14 and the striking member 12 can be made of a polymeric material that is well suited for use in injection molding manufacturing processes. Other constructions can include the use of wood or metal constructions for the body member 14 and/or the striking member 12, as long as the given construction produces the desired sounds similar to the rattling antlers of sparring antlered animals.

Turning now to a discussion of the operation of the game call 10 of the present invention, an operator grasps the striking member 12 by the handle 64 and strikingly engages the striking bar 66 against the body member 14 in various ways to create sounds similar to that of antlered game animals, such as deer, engaging in sparring or in battle.

As two deer spar, for example, in early phases of the match the respective antlers will touch and click as the deer line up to face off. This sound can be simulated as shown in FIG. 7 by the user grasping the handle 64 with his hand (not shown) and striking the striking bar 66 against the upstanding portions 30, 32 of the web 25 in a transverse movement of the striking bar generally designated by the reference numeral 82. The sound created can be varied by changing the magnitude of the force with which the striking bar 66 is struck against the body member 14, and by changing the location of the striking action relative to the scalloped surfaces 45, 47. The sound created can also be varied by changing the rapidity with which the striking bar 66 is struck against the body member 14, or in other words, the pace with which the striking bar 66 is moved. As FIGS. 8a–8c illustrate, the sounds created will also vary depending on whether only one of the upstanding members 30, 32 of the web 25 is struck (as in FIGS. 8a and 8b) or whether both upstanding members 30, 32 of the web 16 are struck simultaneously (as in FIG. 8c).

In subsequent phases of the sparring match, more violent and rapid bursts of clashing occurs as the deer butt their respective antlers in battle. This sound can be simulated as shown in FIG. 7 by the user grasping the handle 64 with his hand (not shown) and sliding the striking bar 66 longitudinally (denoted by reference numeral 84) against the scalloped surfaces 45 and/or 47. The sound created will be varied by changing the force and the pace with which the striking bar 66 is pressingly engaged against the body member 14, and as above, the sounds created will vary depending on whether only one of the upstanding portions 30, 32 of the web 25 is slidingly engaged (as in FIGS. 8a and 8b) or whether both upstanding portions 30, 32 of the web 25 are simultaneously slidingly engaged (as in FIG. 8c). In the event that only one of the upstanding portions 30, 32 of the web 25 are slidingly engaged (as in FIGS. 8a or 8b), the sound will also be varied by selectively changing the angle of the striking bar 66 relative to the upstanding portions 30, 32 of the web 25.

Accordingly, the foregoing description in light of the drawings affords an understanding of the present invention, whereby the following method of attracting antlered game animals is provided to the user in accordance with the following steps:

(a) providing a game call apparatus with a striking member used in combination with a body member to create sounds similar to rattling antlers, wherein the body member has a proximal end and a longitudinally disposed distal end with a medial portion interposed between the proximal end and the distal end, the body member furthermore having a central cavity bounded by an inner surface, an outer surface, and a pair of opposing longitudinal edges joining the inner and outer surfaces and defining a longitudinal opening contiguous with the central cavity, a first scalloped surface extending from the outer surface adjacent a first edge of the pair of opposing longitudinal edges and a second scalloped surface extending from the outer surface adjacent a second edge of the pair of opposing longitudinal edges;

(b) grasping the striking member;

(c) striking the striking member on the body member and sliding the striking member longitudinally along the body member to create sounds similar to rattling antlers.

Additionally, the following steps may be added to the method of attracting antlered game animals described above:

(d) attaching the body member to a portion of the user's body;

(e) holding a desired equipment component in a selected position with a free hand that is not grasping the striking member; and (f) attaching the striking member to the body member with a flexible attachment member so that the striking member can be dropped and the attachment member thereby suspends the dropped striking member from the body member, thus providing for a substantially silent dropping of the striking member.

What is claimed is:

1. A game call for creating a sound similar to rattling antlers for attracting antlered animals, comprising in combination:

a body member having a proximal end and a longitudinally disposed distal end with a medial portion interposed between the proximal end and the distal end, the body member furthermore having a central cavity bounded by an inner surface, an outer surface, and a pair of opposing longitudinal edges joining the inner and outer surfaces and defining a longitudinal opening contiguous with the central cavity, a first scalloped surface extending from the outer surface adjacent a first edge of the pair of opposing longitudinal edges and a second scalloped surface extending from the outer surface adjacent a second edge of the pair of opposing longitudinal edges; and a striking member having a handle and a striking bar extending from the handle.

2. The game call of claim 1 further comprising an attachment member having a first end, a second end and a medial portion interposed therebetween the first end and the second end, wherein the first end of the attachment member is attached to the handle of the striking member and the second end of the attachment member is attached to the body member.

3. The game call of claim 1 wherein the body member has a substantially arcuate lateral cross-section.

4. The game call of claim 1 wherein the inner surface of the body member is substantially concave.

5. The game call of claim 1 wherein each of the scalloped surfaces comprises a plurality of concave indentations longitudinally spaced along the medial portion of the body member, wherein each of the plurality of concave indentations has a proximal end intersecting one of the opposing edges of the body member and a distal portion extending laterally from the respective edge of the body member.

6. The game call of claim 5 wherein the plurality of concave indentations comprises a plurality of first characteristic concave indentations extending laterally a first selected length from the first edge and from the second edge, respectively, and a plurality of second characteristic concave indentations extending a second selected length from the first edge and the second edge, respectively.

7. The game call of claim 6 wherein the selected length of each of the plurality of the first characteristic concave indentations is greater than the selected length of each of the plurality of the second characteristic concave indentations.

8. The game call of claim 7 wherein the selected length of each of the plurality of the first characteristic concave indentations is substantially twice as long as the selected length of each of the plurality of the second characteristic concave indentations.

9. The game call of claim 6 wherein the plurality of concave indentations adjacent the first edge and the second edge, respectively, further comprise a longitudinal alternating arrangement of the first characteristic concave indentations and the second characteristic concave indentations.

10. The game call of claim 5 wherein each of the plurality of concave indentations adjacent the first edge of the body member is opposingly aligned with one of the plurality of concave indentations adjacent the second edge of the body member.

11. The game call of claim 10 wherein the opposingly aligned concave indentations nearest the proximal end of the body member comprises a first characteristic concave indentation adjacent the first edge and an opposing second characteristic concave indentation adjacent the second edge.

12. The game call of claim 1 wherein the body member further forms an aperture for a receiving disposition of the striking bar of the striking member for operative storage of the striking member.

13. The game call of claim 1 further comprising a strap disposed longitudinally within the central cavity of the body member and adapted for attachment of the body member to a portion of a user's body for an operative supporting engagement of the body member.

14. A game call for creating a sound similar to rattling antlers for attracting antlered animals, comprising in combination:

a substantially annular body member having a proximal end and a longitudinal distal end, and a pair of opposing edges comprising a first edge and an opposing second edge with a web interposed therebetween the first edge and the second edge thereby substantially enclosing a central cavity, the first edge and the second edge defining a longitudinal opening intersecting the central cavity; and a striking member for strikingly engaging the body member and thereby creating percussions that simulate the sound of rattling antlers.

15. The game call of claim 14 further comprising a first scalloped surface extending from the body member adjacent the first edge and a second scalloped surface extending from the body member adjacent the second edge.

16. The game call of claim 14 further comprising an attachment member having a first end, a second end and a medial portion interposed therebetween the first end and the second end, wherein the first end of the attachment member is attached to the striking member and the second end of the attachment member is attached to the body member.

17. The game call of claim 15 wherein each of the scalloped surfaces comprises a plurality of concave indentations disposed in the body member and adjacent the first edge and a plurality of concave indentations disposed in the body member and adjacent the second edge, wherein each of the concave indentations has a proximal end intersecting the respective edge of the body member and a distal portion extending laterally from the proximal end of the concave indentation.

18. The game call of claim 17 wherein the plurality of concave indentations comprises a plurality of first characteristic indentations extending a first selected length from the first edge and extending the first selected length from the second edge, respectively, and a plurality of second characteristic indentations extending a second selected length from the first edge and extending the second selected length from the second edge, respectively.

19. The game call of claim 18 wherein the plurality of concave indentations adjacent the first edge and the plurality of concave indentations adjacent the second edge further comprise a longitudinally alternating arrangement of the first characteristic concave indentations and the second characteristic concave indentations.

20. The game call of claim 19 wherein each of the plurality of concave indentations adjacent the first edge of the body member is opposingly aligned with one of the plurality of concave indentations adjacent the second edge of the body member to provide a plurality of opposingly aligned pairs of concave indentations.

21. The game call of claim 20 wherein an opposingly aligned pair of concave indentations of the plurality of opposingly aligned pairs of concave indentations nearest the proximal end of the body member comprises a first characteristic concave indentation adjacent the first edge and an opposing second characteristic concave indentation adjacent the second edge.

22. The game call of claim 14 wherein the body member further forms an aperture for a receiving disposition of the striking member for an operative storage of the striking member.

23. The game call of claim 14 further comprising a strap disposed longitudinally within the central cavity of the body member and adapted for attachment of the body member to a user's leg for an operative supporting engagement of the body member.

24. A method for attracting antlered game, comprising the steps of:

(a) providing a game call apparatus with a striking member used in combination with a body member to create sounds similar to rattling antlers, wherein the body member has a proximal end and a longitudinally disposed distal end with a medial portion interposed between the proximal end and the distal end, the body member furthermore having a central cavity bounded by an inner surface, an outer surface, and a pair of opposing longitudinal edges joining the inner and outer surfaces and defining a longitudinal opening contiguous with the central cavity, a first scalloped surface extending from the outer surface adjacent a first edge of the pair of opposing longitudinal edges and a second scalloped surface extending from the outer surface adjacent a second edge of the pair of opposing longitudinal edges;

(b) grasping the striking member;

(c) striking the striking member on the body member and sliding the striking member longitudinally along the body member to create sounds similar to rattling antlers.

25. The method of claim 24 further comprising the steps of:

(d) attaching the body member to a portion of the user's body;

(e) holding a desired equipment component in a selected position with a free hand that is not grasping the striking member; and (f) attaching the striking member to the body member with a flexible attachment member so that the striking member can be dropped and the attachment member thereby suspends the dropped striking member from the body member, thus providing for a substantially silent dropping of the striking member.

* * * * *